April 27, 1965   T. W. JUDD ETAL   3,180,230
DEFECT MARKING APPARATUS
Filed April 9, 1963                                         4 Sheets-Sheet 1

INVENTORS
TYLER W. JUDD
JOSEPH M. MANDULA JR.
BY Watts & Fisher
ATTORNEY

April 27, 1965  T. W. JUDD ETAL  3,180,230
DEFECT MARKING APPARATUS
Filed April 9, 1963  4 Sheets-Sheet 2

INVENTOR.
TYLER W. JUDD
JOSEPH M. MANDULA JR.
BY Watts & Fisher
ATTORNEY

FIG.-5

April 27, 1965   T. W. JUDD ETAL   3,180,230
DEFECT MARKING APPARATUS
Filed April 9, 1963   4 Sheets-Sheet 4

FIG. 6

INVENTOR.
TYLER W. JUDD
JOSEPH M. MANDULA JR.
BY Watts & Fisher
ATTORNEY

United States Patent Office 3,180,230
Patented Apr. 27, 1965

3,180,230
DEFECT MARKING APPARATUS
Tyler W. Judd, Chardon, and Joseph M. Mandula, Jr., Cleveland, Ohio, assignors to Republic Steel Corporation, Cleveland, Ohio, a corporation of New Jersey
Filed Apr. 9, 1963, Ser. No. 271,788
18 Claims. (Cl. 90—15)

The present invention relates to the detection of defects in metallic workpieces and more particularly relates to an apparatus for marking the location of the defects on the workpieces.

In the manufacture of wire, bars, and other metallic workpieces one problem has been the detection of seams and other defects and marking their location so they are easily locatable by either visual inspection or suitable equipment. In the case of heavy workpieces, such as bars, it is often necessary that the marks indicating the location of the defects should be readily, visually observable for their subsequent removal to salvage the bar. In the case of lighter workpieces, such as wire, the mark must often be detectable by automatic rejection equipment.

Prior to the present invention, there has not been any satisfactory mechanism to mark the location of the defect on the workpiece. Prior marking mechanisms are not capable of precision marking; i.e., placing the mark precisely at the location of the defect. Marks made by prior art mechanisms are not always readily visible, nor are they very permanent. Moreover, past marking methods do not satisfactorily penetrate rust, scale, and the like, especially in the case of hot rolled bars. Finally, marks by prior mechanisms are not permanent in that they do not withstand abrasive handling.

The present invention provides a defect marking apparatus which marks the location of detected defects in a workpiece. Marks made by the present apparatus are permanent and easily visible even though the workpiece may be subject to abrasive handling. The present defect marking apparatus includes a rotating cutter of carbide or other suitable material which is movable to engage the workpiece and cut an impression therein, but which is normally biased out of engagement wtih the workpiece. An actuator is adapted to move the cutter into the workpiece for the duration of an energizing pulse introduced into the input of the actuator. Defect detection equipment is disposed adjacent the workpiece ahead of the cutter and produces a defect signal each time a defect is detected. The detection equipment and the workpiece are relatively rotatable such that the detection equipment describes a helical path around the moving workpiece. A control circuit is connected to both the detection equipment and the actuator and for each defect signal received, it introduces an energizing signal tc the actuator with the result that the cutter momentarily engages the worpiece at least once for every energizing signal pulse received.

An advantage of the defect marking apparatus of the present invention is that the cutter only momentarily engages the workpiece to provide a single short mark rather than a continuous mark for the duration of the defect. This arrangement increases the life of the cutter. In addition, should the defect detection equipment or other mechanism fail, the cutter will be placed in its non-engaging position spaced from the moving workpiece. This arrangement provides a "fail-safe" feature so that a mechanism failure never results in a continuous unnecessary cut along the workpiece. Finally, the duration of the energizing pulse produced by the control circuit is adjustable to adjust the size of the impression or the mark made in the workpiece.

The operation of the actuator in marking the location of the defects is controlled by the control circuit in direct relation to the defects detected by the detection equipment. One form of the control circuit is especially suitable for high speed marking of the location of defects in wire or other similar small elongated workpieces. When the apparatus of the present invention is used as a wire defect marker, the cutter is caused to engage the moving workpiece intermittently to provide a plurality of notches for the length of the defect detected. Where the defect is a long one, a continuous indication of the defect is necessary. In the latter instance, a series of notches is more desirable than one long cut, especially if cutter life is to be increased.

Another reason for providing the notch is related to the equipment provided for rejecting defective portions of the wire. Such rejection equipment may utilize an air gage having a die through which the wire passes. When sound wire passes through the die of the air gage, air pressure is maintained at the die. When the cross-section of the same diameter wire is cut away sufficiently and the wire is again passed through the die, air will leak out of the die causing a measurable reduction of air pressure. The change in air pressure is used to operate rejection equipment. Air gages can sense a notch as small as 0.010 of an inch deep and ⅛th of an inch long in wire ranging from at least $\frac{5}{16}$ths to $\frac{5}{8}$ths in diameter. The control circuit of the wire defect marker of the present invention controls operation of the cutter to provide such a notch in the workpiece. In addition, in order to provide accurately spaced marks of uniform depth and duration, the control circuit has the following operating characteristics:

(1) The actuator is alternately energized and de-energized as long as the defect signal is received from the detection equipment. The energized or "on" periods and the de-energized or "off" periods of the actuator may be adjusted to be equal in length.

(2) If the defect signal terminates while the actuator is energized, the actuator remains energized until the completion of its "on" period.

(3) If the defect signal terminates while the actuator is not energized, the actuator must remain de-energized for at least the duration of its "off" period.

(4) To allow the cutter to precisely mark the longitudinal location of a defect, the control circuit always commences each cycle of operation with the actuator energized. In addition, the actuator is energized as soon as a defect signal is received, subject to the limitations of item (3) above.

The control circuit of the present defect marking apparatus takes a second form for marking defects in bars and other large elongated workpieces. When the present apparatus is used as a bar defect marker the cutter momentarily engages the workpiece and cuts a slight impression in the workpiece which produces a shiny mark preferably a few thousands of an inch deep and ⅜ths of an inch in diameter. This mark is readily visible and is permanent.

Since the cutter or marker and the defect detection equipment cannot be in the same physical location, the marker is placed behind or "downstream" of the detection equipment. Both are preferably placed in a longitudinal line on the same side of the bar. The longitudinal spacing between the marker and the detection equipment is set at a convenient value, e.g., three inches. The bar travel through the apparatus is helical and forward bar travel per revolution is maintained equal to the spacing between the marker and the detection equipment. Upon receiving a defect signal from the detection equipment the control circuit delays sending an energizing signal to the actuator for the time period of one bar revolution. Since forward bar travel per revolution is equal to the spacing between the detection equipment and the marker and the energizing signal is delayed for the period of one revolution of the bar, then the mark made by the cutter will fall exactly on the location of the defect.

In use it has been found that more than one defect is likely to occur during the delay period and unless accounted for not all defects will be marked. For example, where a three inch spacing is provided between the detector and the marker and the delay period is approximately .120–.640 second depending on bar diameter, it has been found that a maximum of four defects are likely to occur during the delay period. The present invention accommodates the additional defect signals during the delay period by providing a control circuit having a plurality of time delay circuits and a counting circuit to sequentially separate the defect signals into the time delay circuits. The number of time delay circuits is directly related to the maximum number of defects likely to occur during the delay period. The outputs of the time delay circuits are connected to sequentially energize the actuator in a time-spaced relation identical to the timed spacing of the defects as detected by the detection equipment. Thus, the present apparatus assures that every defect detected will be marked.

Objects and a fuller understanding of the invention may be had by referring to the following description and claims taken in conjunction with the drawings in which:

Figure 1:
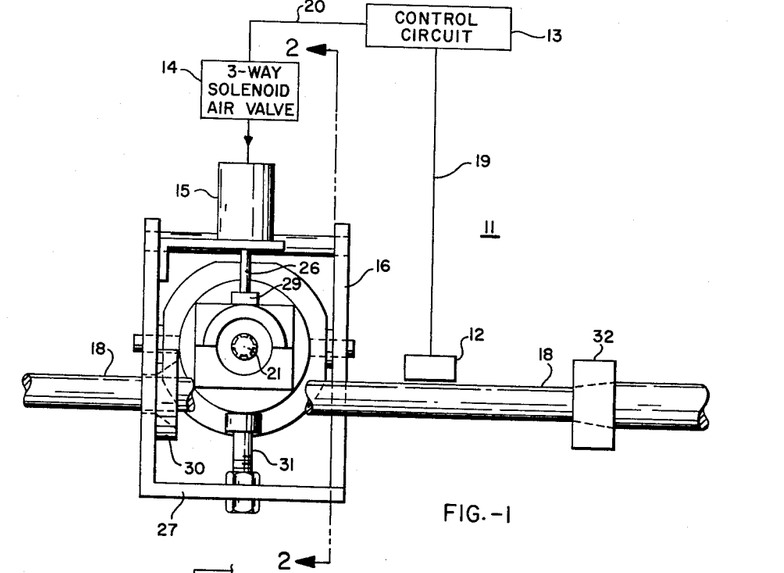
FIGURE 1 is a schematic diagram of the defect marking apparatus of the present invention.
Figure 2:
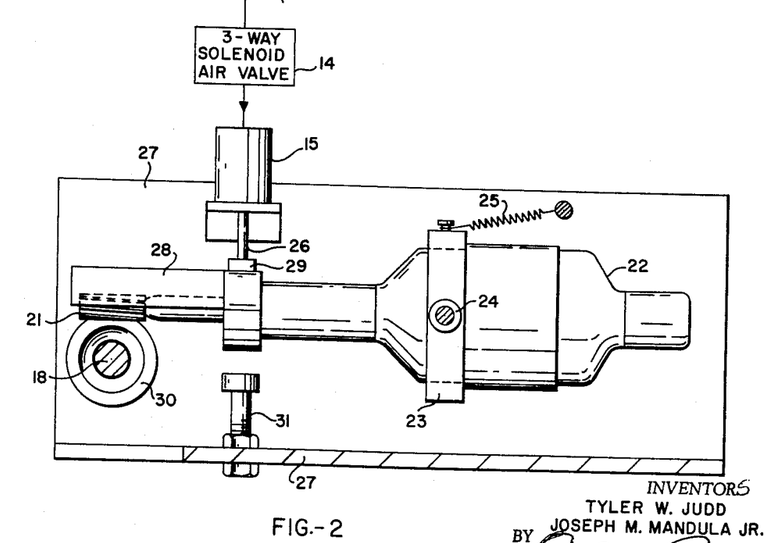
FIGURE 2 is a side elevational view of a part of the apparatus of FIGURE 1.

Referring now to the drawings, wherein like reference characters indicate like or corresponding parts throughout the several views, the defect markings apparatus of the present invention is indicated generally by the reference character 11. The defect marking apparatus 11 includes defect detection equipment 12, a control circuit 13, a three-way solenoid air valve 14, an air cylinder 15, and a cutter mechanism 16. The defect detection equipment 12 is disposed adjacent an elongated workpiece 18 and the two are mounted for relative rotation, the rotating element being determined by the type of detection apparatus used and the nature and size of the workpiece. The workpiece 18 is shown with an intermediate portion removed to clearly illustrate details of the cutter mechanism 16.

The output defect signal pulse from the detection equipment 12 is introduced to the input of the control circuit via a line 19. For each defect signal received, the control circuit 13 will produce at least one energizing pulse of adjustable duration. The energizing pulse produced by the control circuit 13 energizes the three-way solenoid air valve 14 via a line 20. When energized, the solenoid air valve 14 allows air to flow into the air cylinder 15 to cause the cutter mechanism to engage the workpiece 18. The cutter mechanism will remain in engagement with the workpiece for the duration of the energizing pulse introduced to the air valve 14.

The cutter mechanism 16 includes a carbide cutter 21 which is driven by the shaft of a high speed motor 22. The motor 22 is continually energized to cause continual rotation of the carbide cutter 21. The motor 22 is mounted in a ring housing 23 which pivots on bearings 24 relative to a support base 27. A spring 25 normally biases the carbide cutter in a retracted position spaced from the workpiece 18. The air cylinder 15 includes a piston rod 26 which is connected to a cutter guard 28 on the motor by a shock absorbent material 29.

A guide 30 is secured to the support base 27 to assure accurate positioning of the workpiece relative to the cutter when the defect marking apparatus is used for wire or other small forms of the workpiece 18. The guide 30 comprises an annular member having a tapered central hole which is aligned with a hole in a vertical wall of the support base 27. An adjustable stop member 31 is secured to a bottom wall of the support base 27 and is disposed under the shaft end of the motor to limit the pivotal movement of the carbide cutter relative to the workpiece. The guide 30 by positioning the workpiece 18 and the stop member 31 by positioning the cutter determine the depth and size of a mark cut in the workpiece.

*Wire defect marker*

When the defect marking apparatus 11 is used as a wire defect marker, the defect detection equipment 12 operates preferably on a magnetic field principle. The defect detection equipment 12 imparts a magnetic field to the workpiece or wire 18 and detects a seam or other defect by detecting a change in the strength of the magnetic field. The defect detection equipment 12 includes a search probe preferably located near a drawing die 32. Suitable structure (not shown) is provided to rotate the search probe around the wire 18 as the wire passes longitudinally in relation to the search probe. Whenever a defect is detected, the detection equipment 12 indicates its presence by an audible alarm and a 110 volt, 60 cycle signal pulse. This 60 cycle signal pulse is produced at the output of the detection equipment for the total time a defect is detected, a short signal time for a short defect and a long signal time for a long defect. The line 19 introduces these 60 cycle signal pulses to the input of the control system 13.

Figure 3:
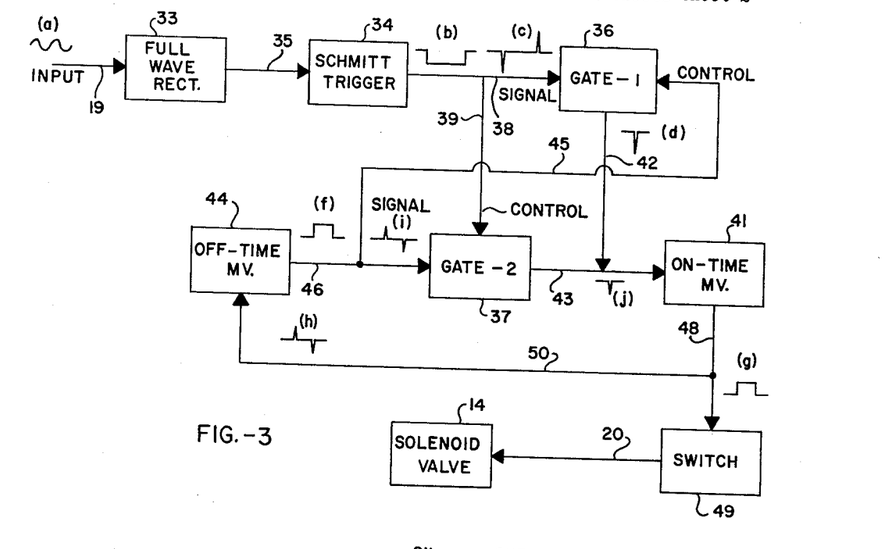
FIGURE 3 is a block diagram of one form of a control circuit used in the apparatus shown in FIGURE 1.
Figure 5:
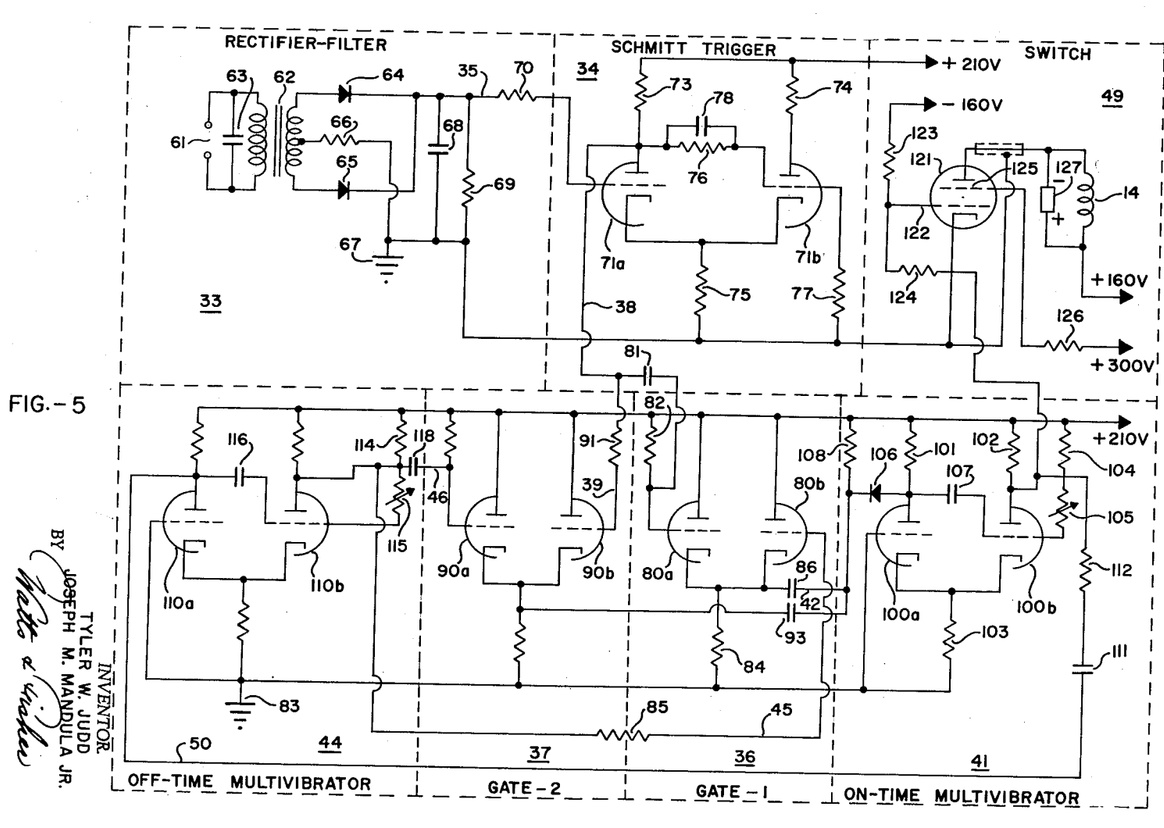
FIGURE 5 is a circuit diagram of the control circuit shown in FIGURE 3.

The control system 13 of the wire defect marker form of the present invention is shown in FIGURES 3 and 5. As previously noted, FIGURE 3 shows a block diagram of the electrical control system 13. In this control system the 60 cycle defect signal (*a*) from the detection equipment is introduced to the input of a full wave rectifier and filter section 33 via the line 19. The voltage output of the rectifier section 33 is a fluctuating D.C. signal which is introduced to the input of a Schmitt trigger 34 via a line 35. The Schmitt trigger 34 transforms the fluctuating D.C. signal into a negative going rectangular wave shape (*b*) of constant amplitude, the duration of which is equal to the duration of the 60 cycle signal (*a*) received from the detection equipment. This negative going rectangular wave shape (*b*) is introduced to first and second gating sections 36, 37 via lines 38, 39 respectively.

The rectangular wave shape (*b*) before it is introduced to the first gating section 36 is differentiated to form the trigger signal (*c*) having negative and positive going voltage spikes. The first gating section 36 is, in effect, normally closed and passes the negative spike to operate an ON-TIME single shot multivibrator 41 via lines 42, 43. The negative going spike of the trigger signal (*c*) is a trigger pulse for the ON-TIME multivibrator 41 and is indicated by the reference character (*d*). The control voltage for the first gating section 36 is obtained from the output of an OFF-TIME single shot multivibrator 44 via a line 45. When a voltage pulse (*f*) is produced by the OFF-TIME multivibrator 44, it will shift the first gating section 36 from its normally closed state to an open state.

The rectangular wave shape (*b*) introduced to the second gating section 37 is a control voltage for the second gating section and shifts it from, in effect, a normally open state to a closed state. The signal input for the second gating circuit 37 is the voltage pulse (i) obtained from the output of the OFF-TIME multivibrator 44 via a line 46.

The pulse (d) passed to the ON-TIME multivibrator 41 from the first gating section 36 serves as a triggering pulse so that the output of the multivibrator 41 produces an energizing pulse (g) of adjustable duration, preferably 38 milliseconds. This timed energizing pulse (g) is (one) introduced via a line 48 to a switching circuit 49 to activate the solenoid air valve 14 for the duration of the pulse, and (two) differentiated and introduced as an initiating trigger pulse (h) to the input of the OFF-TIME multivibrator 44 via a line 50. At the completion of the 38 millisecond period of the ON-TIME multivibrator 41, the negative going portion of the differentiated pulse (h) triggers the OFF-TIME multivibrator 44 into operation to produce the pulse (f) of an adjustable time duration, also preferably 38 milliseconds. The voltage pulse (f) is (one) introduced as a control pulse to the first gating circuit 36 via the lines 46, 45 and (two) differentiated and introduced as an input signal (i) to the second gating section via the line 46. As a control voltage to the first gating section 36, the voltage pulse (f) shifts the first gating section 36 to, in effect, an open state so that it does not produce the output trigger pulse (d) as long as the OFF-TIME single shot multivibrator 44 is in operation. At the same time, if the second gating circuit 37 is in a closed state because of the presence of the 60 cycle signal (a) from the detection equipment, the 38 millisecond pulse (i) introduced to the second gating section 37 will result in a negative going pulse (j) at its output coincident with the completion of the OFF-TIME period of the 38 millisecond pulse (f). In other words, the trigger pulse (j) is time delayed 38 milliseconds relative to the completion of the energizing pulse (g) produced by the ON-TIME multivibrator 41. It is pulse (j) which triggers the ON-TIME multivibrator to again cause actuation of the solenoid air valve to mark the wire. This cycle will repeat itself as long as the second gating circuit 37 is maintained in a closed state by the output of the Schmitt trigger 34. Thus, the carbide cutter 21 will momentarily engage the wire for approximately 38 milliseconds each time a pulse (g) is produced by the ON-TIME multivibrator 41 so that a series of equally spaced marks will appear on the wire over the length of the defect detected.

When the search probe reaches the end of the defect the 60 cycle signal (a) terminates with the result that the second gating circuit 37 opens and prevents further trigger pulses (j) from reaching the ON-TIME multivibrator 41. Should the defect terminate and then recur while the OFF-TIME multivibrator is in operation, the first gating section 36 is in the open state and will not pass an initiating trigger pulse (d) to the ON-TIME multivibrator 41. This arrangement assures that the off time will always be the full 38 millisecond period set by the OFF-TIME multivibrator.

FIGURE 5 shows the circuit elements of the electrical circuit represented by the block diagram of FIGURE 3. The rectifier-filter section 33 includes input terminals 61 which are connected to the output of the defect detection equipment via line 19 to receive the 115 volt, 60 cycle defect signal. The defect signal is coupled to the rectifier circuit 33 by a transformer 62, the primary of which is shunted by a capacitor 63. The rectifier circuit includes two diodes 64, 65 connected to the output terminals of the transformer 62 in a conventional full-wave rectifier arrangement. A resistor 66 is connected between a ground connection 67 and a center tap on the secondary winding of the coupling transformer 62 to limit the secondary winding current. The filter circuit portion of the rectifier-filter section 33 includes a parallel combination of a capacitor 68 and a resistor 69 connected between the ground connection 67 and the conductor 35 which corresponds to line 35 in FIGURE 3. A positive voltage is developed across the resistor 69 whenever an input signal is present at the terminals 61. The conductor 35 introduces this positive voltage to the Schmitt trigger 34 and includes a resistor 70 which serves to limit the current introduced to the grid of one section 71a of a dual triode tube 71.

The dual triode tube includes two sections 71a, 71b connected as a Schmitt trigger. The plates of both sections 71a, 71b are connected to a positive 210 v. supply through load resistors 73, 74 respectively. The cathodes of the tube sections 71a, 71b are connected to the ground connection 67 through a bias resistor 75. The tube section 71a is normally cut off or nonconducting and the tube section 71b is normally conducting. This is accomplished by connecting the grid of the tube section 71a to the ground connection 67 via the resistors 70, 69 while maintaining a positive voltage on the grid of the tube section 71b by means of a voltage divider provided by resistors 76, 77. The resistor 77 is connected between the grid of the tube section 71b and the ground connection 67 and the resistor 76 is connected between the grid of the tube section 71b and the plate of the tube section 71a.

When the positive voltage appearing across the resistor 69 is impressed on the grid of the tube section 71a, this grid swings out of cutoff causing the tube section 71a to begin to conduct with the result that its plate voltage drops. This decrease in plate voltage is transferred to the grid of the tube section 71b through the parallel combination of the resistor 76 and a capacitor 78 and reduces the current flow through the tube section 71b. This reduction in current flow causes both cathodes to become less positive, thereby increasing the conduction of the tube section 71a and further reducing the conduction of the tube section 71b until the tube section 71b cuts off.

During the time the tube section 71a is conducting, its plate maintains a constant potential considerably less than the positive 210 v. supply thus giving the negative going rectangular output wave shape (b). Upon termination of the 60 cycle defect signal (a) to the terminals 61, and consequently of the positive potential applied to the grid of the tube section 71a, this grid reverts to ground potential causing the current flow through the tube section 71a to decrease. This results in the plate of the tube section 71a becoming more positive, thereby increasing the potential on the grid of the tube section 71b with the result that the tube section 71b conducts more heavily. This in turn raises the potential at the cathodes to cut off the conduction in the tube section 71a and returns the Schmitt trigger to its initial stable state.

The negative going rectangular wave shape (b) appearing at the plate of the tube section 71a is differentiated by a capacitor 81 in the conductor 38, and a resistor 82 before introducing it into the first gating section 36. The differentiated signal is introduced to the grid of section 80a of a dual triode tube 80 having two sections 80a, 80b connected as a parallel cathode-follower gating circuit. The plates of both tube sections 80a, 80b are connected directly to a positive 210 v. supply and the cathodes of both sections are connected to a ground connection 83 through a resistor 84. Initially, the tube section 80a is in a "clamped" state because of the presence of the resistor 82. The grid of the tube section 80b is connected to the output of the OFF-TIME multivibrator 44 via the conductor 45. A resistor 85 is connected in series with the conductor 45 to limit the control voltage for the first gating circuit 36 as obtained from the OFF-TIME multivibrator. The tube section 80b is in a normally cut-off or non-conducting state. As long as the tube section 80b remains in a non-conducting state, the negative going portion of the trigger pulse (c) applied to the grid of the tube section 80a appears as the trigger pulse (d) at the cathode of the tube section 80a due to cathode follower action. This negative going trigger pulse (d) is coupled to the input of the ON-TIME multivibrator 41 by a capacitor 86 in the conductor 42.

Whenever the OFF-TIME single-shot multivibrator is in operation and producing one or more 38 millisecond pulses (*f*) each of these highly positive output pulses is transferred via the conductor 45 through the resistor 85 to the grid of the tube section 80*b*. The positive pulse (*f*) causes the tube section 80*b* to conduct heavily and increases the cathode potential. Under the latter condition, a signal applied to the grid of the tube section 80*a* from the Schmitt trigger will not be able to reduce the potential on the cathodes sufficiently to overcome the effect of the conduction in the tube section 80*b*. Hence, there can be no output trigger pulse (*d*) from the first gating section during the 38 millisecond interval that the OFF-TIME single shot multivibrator is in operation.

The second gating section 37 includes two sections 90*a*, 90*b* of a dual triode tube 90 connected as a parallel cathode-follower gating circuit. The circuit functions, components, and connections are the same as those of the first gating section 36 except that in this gating section the control voltage is obtained from the plate of the tube section 71*a* in the Schmitt trigger through a resistor 91 in the conductor 39. As long as an input control pulse (*b*) is received from the Schmitt trigger the tube section 90*b* will be cut off.

The trigger pulse (*i*) from the OFF-TIME multivibrator is introduced to the grid of the tube section 90*a* via the conductor 46. Because the grid of the tube section 90*a* is at a highly positive potential, it is not until the negative-going spike of the trigger pulse (*i*) is impressed on it that the second gate 37 will close and trigger the "ON-TIME" multivibrator 41 through a capacitor 93. This provides a time delay of 38 milliseconds between the triggering of the OFF-TIME multivibrator 44 and the triggering of the ON-TIME multivibrator 41. Upon termination of the 60 cycle signal (*a*) from the defect detection equipment 12 the plate of the tube section 71*a* of the Schmitt trigger will attain the positive supply poential, thus driving the grid of the tube section 90*b* highly positive. The tube section 90*b* then begins to conduct heavily, increasing the cathode potential and returning the second gating circuit 37 to its normally open state.

The ON-TIME single shot multivibrator 41 includes a dual triode tube 100 having two sections 100*a*, 100*b* which are connected so as to provide a cathode coupled single shot multivibrator. The plates of the tube sections 100*a*, 100*b* are connected to the 210 v. positive supple through resistors 101, 102. The cathodes of the tube sections 100*a*, 100*b* are connected to the ground connection 83 through a resistor 103. The tube section 100*a* is normally cut off or nonconducting and the tube section 100*b* is normally conducting. This is accomplished by connecting the grid of the tube section 100*a* directly to ground while at the same time maintaining a positive potential on the grid of the tube section 100*b* by connecting it to the positive 210 v. supply through a resistor 104 and a potentiometer 105.

The input trigger pulses (*d*), (*j*) from either of the gating circuits 36, 37 are introduced to the grid of the tube section 100*b* through one of the capacitors 86, 93 respectively, a diode 106 and a timing capacitor 107. A resistor 108 is provided to hold the cathode of the diode 106 at the 210 v. supply in the absence of such input trigger pulses (*d*), (*j*). When triggered, the grid of the tube section 100*b* is driven towards the cutoff point, thereby causing a more negative potential to appear on the cathodes of the tube sections 100*a*, 100*b*. The tube section 100*a* then begins to conduct causing a further decrease of potential at the grid of the tube section 100*b* and holding it below cutoff until the timing capacitor 107 can discharge through the resistor 104 and the potentiometer 105. When the charge on the timing capacitor 107 has decayed sufficiently, the grid of the tube section 100*b* swings out of cutoff and the tube section 100*b* once again conducts causing the cathode voltage to rise and cut off the tube section 100*a*. The ON-TIME multivibrator 41 is now in its stable state where it will remain until triggered again by a pulse from either of the gating circuits 36, 37. The output signal of the ON-TIME multivibrator is taken from the plate of the tube section 100*b* which attains the 210 v. positive supply potential during the time it is cut off which is approximately 38 milliseconds preferably. The potentiometer 105 provides a means of adjusting the duration of the output pulse for setting the on time period.

The OFF-TIME multivibrator 44 includes a dual triode tube 110 having two sections 110*a*, 110*b* which are connected as a cathode coupled single shot multivibrator. The circuit functions, components, and connections of the OFF-TIME multivibrator 44 are the same as those of the ON-TIME multivibrator 41 except no triggering diode is provided. The output pulse (*g*) of the ON-TIME multivibrator, after being differentiated by a capacitor 111 in the conductor 50, serves as the input trigger pulse (*h*) to the OFF-TIME multivibrator. A resistor 112 is provided in the conductor 50 to attenuate this trigger pulse to the proper amplitude.

The grid of the tube section 110*b* is "clamped" because of a resistor 114 and a potentiometer 115. Therefore, it is not until the negative going portion of the input pulse (*h*) is impressed on the grid of tube section 110*b* via a timing capacitor 116 that the multivibrator 44 will be triggered. Thus, the OFF-TIME single shot multivibrator will commence its cycle of operation at the instant that the ON-TIME single shot multivibrator has completed its cycle of operation. The output voltage pulse (*f*) is taken from the plate of the tube section 110*b* which attains the positive plate supply potential during the time that it is cut off which is also approximately 38 milliseconds preferably. The potentiometer 115 provides a means of adjusting the duration of the output pulse (*f*).

The one or more output pulses (*f*) taken from the plate of the tube section 110*b* are introduced into the first gating section 36 at the control grid of its tube section 80*b* via the conductor 45, as was explained previously. The 38 millisecond output pulses (*f*) from the plate of the tube section 110*b* are differentiated by a capacitor 118 in the conductor 46 to form the trigger pulses (*i*) which are introduced into the second gating section 37 at the control grid of the tube section 90*a*.

The switch circuit 49 includes a tube 121 connected as a switch to activate the solenoid air valve 14. The tube 121 includes a control grid 122 which is biased by means of voltage divider resistors 123, 124 connected from the output of the ON-TIME multivibrator 41 to a negative 160 v. supply such that the tube 121 is normally cut off. The tube 121 further includes a screen grid 125 which is connected to a positive 300 v. supply through a resistor 126. The cathode of the tube 121 is connected directly to the ground connection 67. The plate of the tube 121 is connected to a positive 160 v. supply through the coil of the solenoid air valve 14. The coil is shunted by an arc suppressor 127 which reduces switching transients.

When the ON-TIME multivibrator 41 is in operation, the plate of the tube section 100*b* is at the plate supply potential, which drives the grid of the switch tube 121 into clamp causing the tube 121 to conduct heavily. This activates the solenoid air valve 14 for a period determined by the duration of the output pulse (*g*) of the ON-TIME multivibrator. Upon termination of the output pulse (*g*) the plate potential of the tube section 100*b* reduces greatly thereby driving the grid 122 of the switch tube 121 below cutoff and de-energizing the solenoid air valve.

*Bar defect marker*

When the defect marking apparatus is used to mark defects in bars and similar workpieces, the guide 30 and the cutter stop 31 are not provided. In addition, the workpiece 18 is positioned about one-half inch below the cutter when the motor assembly is in the retracted position. The defect detection equipment 12 operates preferably on an eddy current principal as described in United States Patent No. 2,832,040, issued to W. C. Harmon. The defect detection equipment 12 includes a small probe coil which rides on the surface of the bar. The probe coil remains longitudinally stationary while the bar is propelled beneath the coil in a helical path.

The present bar defect marking apparatus is particularly usable as part of an automatic bar classification equipment. Such bar classification equipment inspects the moving bars for defects by means of the defect detection equipment 12 which contains suitable electronic circuitry to classify the bars into three classes; good, salvage and scrap. Those bars classed as salvage contain defects which are shallow enough to be removed without interfering with the intended use of the bar. The defect detection equipment 12 produces a defect pulse in the form of a rectangular wave shape for introduction to the control circuit 13 only when the defect depth is between predetermined maximum and minimum limits. Thus, the control circuit 13 causes the cutter mechanism 16 to mark the exact location of only those defects which are to be removed to salvage the bar, all shallow defects less than the minimum limit being inconsequential and those deeper than the maximum limit rendering the bar unsalvageable. After the defects are marked, the classification equipment separates the bars into groups of good, salvage, and scrap bars.

Figure 4:
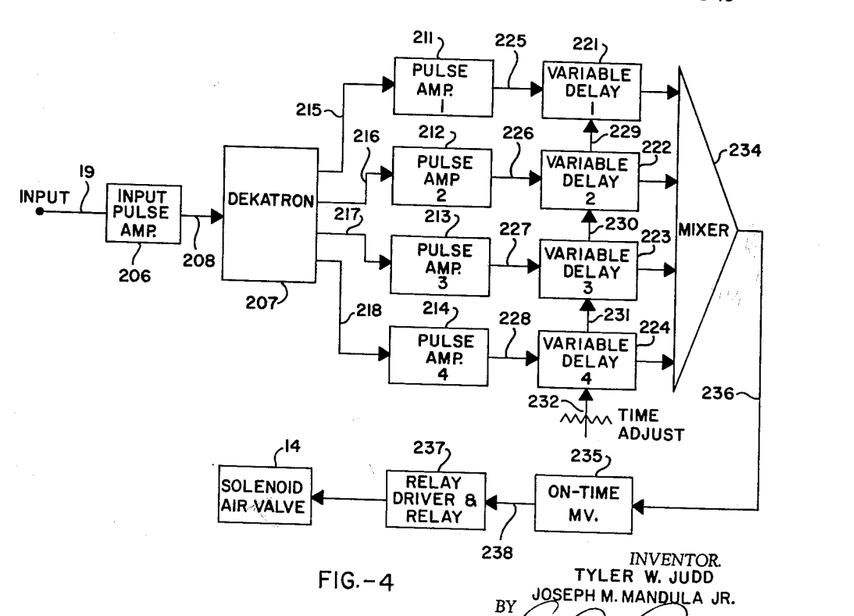
FIGURE 4 is a block diagram of another form of the control circuit used in the apparatus shown in FIGURE 1.

As shown in the block diagram of FIGURE 4, the defect pulses from the detection equipment 12 are introduced via the line 19 to the input of a pulse amplifier section 206 where each rectangular pulse is amplified and inverted so as to be suitable to drive a "dekatron" section 207. A line 208 connects the output of the amplifier section 206 to the input of the dekatron section 207. The dekatron section 207 includes a plurality of outputs which are connected to the inputs of pulse amplifiers 211–214 via the lines 215–218 respectively. As the defect signal pulses are introduced to the input of the dekatron section 207, output pulses will appear at its outputs in a sequential relation. In other words, for the first input pulse introduced to the input of the dekatron section 207 an output pulse will be introduced to the first amplifier 211, for a second input pulse to the dekatron section 207 an output pulse will be introduced to the second pulse amplifier 212, and so forth until the last output circuit 218 is reached so that for the next input signal an output signal is again introduced to the first amplifier section 211 and the cycle repeats itself. The dekatron section 207, therefore, effectively acts as a separation circuit to sequentially separate the input signals and introduce them into separate amplifier circuits where their distinctiveness is maintained during the delay period of the control circuit.

Variable time delay circuits 221–224 are connected to the outputs of the pulse amplifiers 211–214 via lines 225–228 respectively. The delay periods of each of the variable time delay circuits are simultaneously adjustable as indicated by the arrows 229–232 respectively. The outputs of all the time delay circuits 221–224 are connected via a mixer circuit 234 and a line 236 to the input of an ON-TIME multivibrator 235. The ON-TIME multivibrator 235 produces an output energizing signal of a predetermined duration which is introduced into the input of a relay driver 237 via the line 238. The relay driver 237 controls energization of the solenoid air valve 14 to cause the carbide cutter 21 to engage the moving bar for the on-time period set in the multivibrator 235. This on-time period determines, therefore, the size of the mark made on the moving bar.

Although four separation circuits have been shown in the preferred form of the bar marking circuit, it should be recognized that more or less circuits may be provided depending on the maximum number of defects expected to occur within the time required for one revolution of the bar. Since the variable time delays 221–224 operate independently of each other, all of them can be delaying simultaneously to assure marking of all defects that occur within the time period for one bar revolution. Moreover with the sequential separation of the defect signals from the input pulse amplifier 206, once a variable delay has been triggered it cannot be triggered again until each of the remaining variable delays has been triggered. This arrangement allows ample recovery time for the variable delays 221–224.

Figure 6:
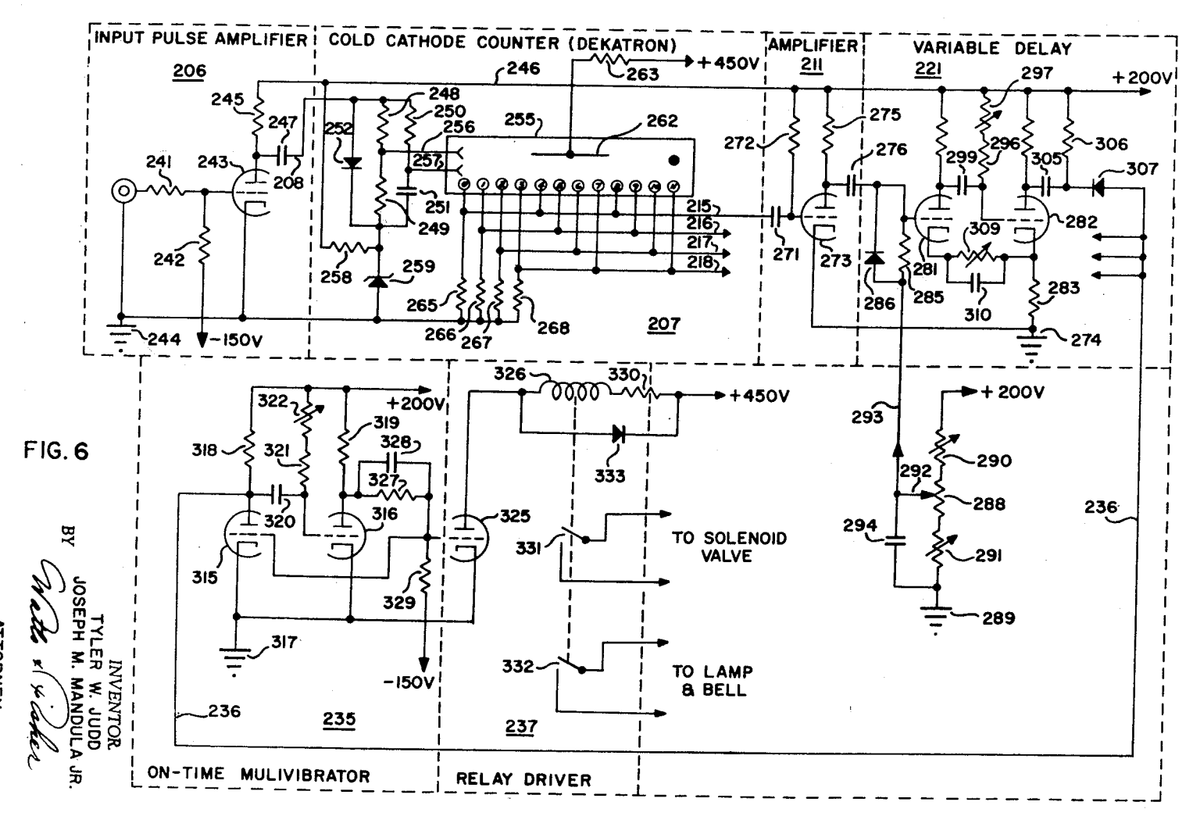
FIGURE 6 is a circuit diagram of the control circuit shown in FIGURE 4.

As shown in FIGURE 6, the input pulse amplifier 206 includes resistors 241, 242 connected to form a voltage divider which properly biases the input to a pulse amplifier tube 243. The amplifier tube 243 provides such amplification and inversion of the input pulse as is necessary to drive the dekatron section 207. The cathode of the tube 243 is connected directly to a ground connection 244. The plate of the tube 243 is connected through a resistor 245 via conductor 246 to positive 200 v. supply. A capacitor 247 couples the output pulses from the plate circuit of the tube 243 to the input of the dekatron section 207 via the conductor 208 which corresponds to line 208 in FIGURE 4.

The input of the dekatron section 207 includes a network of resistors 248–250, a capacitor 251 and a clamping diode 252 connected across the resistors 248, 249. The resistor 250 and the capacitor 251 provide the phase shift necessary to activate the input of a dekatron tube 255. The dekatron tube 255 includes a pair of guides 256, 257 which are positively biased by a resistor 258 and a Zener diode 259 connected between the conductor 246 and the ground connection 244. The dekatron tube 255 includes a plate 262 which is connected to a positive 450 v. supply through a resistor 263 which limits the current to the dekatron tube 255.

The dekatron tube 255 also includes twelve cathodes which are represented by the encircled numbers 0–11. Every fourth cathode is connected together so as to provide four outputs from the twelve cathodes. The outputs are represented by the conductors 215–218. Output load resistors 265–268 are connected between the ground connection 244 and the output conductors 215–218 respectively to provide a load on the cathodes. Initially, the cathode indicated by the encircled numeral "0" is energized and in a state of glow. Each input pulse to the dekatron section 207 causes this "dekatron" glow to advance clockwise to the next cathode. As the glow leaves a cathode, a negative going pulse is developed across its load resistor. For example, the first input pulse to the dekatron tube 255 will cause the glow of the "0" cathode to transfer to the "1" cathode with the result that a negative pulse is developed across the load resistor 265 connected to the "0" cathode. This negative pulse is then introduced to the input of the amplifier circuit 211 where it is amplified, shaped and inverted.

Since the four pulse amplifiers 211–214 and the variable delay sections 221–224 are identical both with respect to construction and operation, only the pulse amplifier 211 and the variable delay section 221 are shown and described. The input to the pulse amplifier 211 includes a capacitor 271 and a resistor 272 connected to form a differentiating network for the input step pulse introduced by the conductor 215. The resistor 272 also holds the grid of a vacuum tube 273 in clamp. The cathode of the tube 273 is connected to a ground connection 274. The plate of tube 273 is connected through a load resistor 275 to a positive 200 v. supply. The negative input step pulses introduced by the conductor 215 and differentiated by the capacitor-resistor network 271, 272 drive the grid of the tube 273 to cutoff, thereby producing a large positive-going pulse at the plate of the tube 273. This positive-going pulse is coupled to the input of the delay section 221 through a capacitor 276.

The variable delay section 221 includes tube sections 281, 282 connected as a cathode-coupled monostable multivibrator. In this multivibrator a nearly linear relationship exists between the period of the cathode-coupled, monostable multivibrator and the control voltage applied to the grid of the normally cut-off tube section 281. This linearity results from the fact that the current through the tube section 281 is linearly related to the control voltage, and the duration of the delay is linearly proportional, in turn, to the tube current. The linearity of tube current with respect to control voltage is provided by a large cathode resistor 283 which introduces negative feedback.

The input of the variable delay section 221 includes a resistor 285 which is bypassed by a diode 286. The diode 286 serves as a clamping diode. The input further includes a variable control voltage circuit to adjust the delay periods of the delay section 221. This variable voltage circuit includes a linear potentiometer 288 which may be remotely located for adjustment of the delay period at the operator's station. The potentiometer 288 is connected between a positive 200 v. supply and a ground connection 289 via potentiometers 290, 291. The potentiometers 290, 291 are provided to adjust the voltage across the potentiometer 288 to the proper value. The potentiometer 288 includes a sliding contact 292 which is connected to the lower end of the grid resistor 285 of all of the variable delay sections 221–224 via the conductor 293. This arrangement provides the variable control voltage for each of the delay sections 221–224. A capacitor 294 connects the conductor 293 to the ground connection 289.

The tube section 282 is normally conducting because of the postive voltage applied to its grid by a resistor 296 and a potentiometer 297. The conduction of the tube section 282 causes a large voltage to develop across the resistor 283 which in turn assures that the tube section 281 is cut off. The tube section 281 is triggered by applying the positive going pulse from the pulse amplifier section 211 to its input. This positive going pulse is inverted by the tube section 281 and appears as a negative going pulse at the grid of the tube section 282 because of the coupling provided by a timing capacitor 299. This action reduces the voltage across the resistor 283 which in turn increases the current flow through the tube section 281. The tube section 281 is now conducting and the tube section 282 is cut off. The tube sections 281, 282 will remain in this condition until the timing capacitor 299 discharges through the resistor 296 and the potentiometer 297. Upon discharge of the timing capacitor 299 the multivibrator circuit will revert to its original stable state with the tube section 282 conducting and the tube section 281 cut off. At the completion of the delay period, the plate of the tube section 282 swings negatively as the tube section 282 begins to conduct. This voltage is differentiated by a capacitor 305 and a resistor 306 and is coupled to the common conductor 236 through a diode 307.

The delay time of the variable delay section 221 is also somewhat dependent upon the setting of the potentiometer 297 and a potentiometer 309 connected between the cathodes of the tube sections 281, 282. Adjustment of the potentiometers 297, 309 provides for tracking of the four delay sections 221–224. Thus, it is not necessary that highly precise circuit components and vacuum tubes be used. A capacitor 310 bypasses the potentiometer 309 to prevent degeneration during the transition from one state to another.

The coupling diode 307 of each of the variable time delay sections 221–224 provides isolation of its respective section. The connection of all the coupling diodes is such that whenever the ON-TIME multivibrator is in operation the delay sections are isolated from the multivibrator as well as from each other. The output of each of the variable delay sections is connected to the input of the multivibrator section 235 via the conductor 236.

The ON-TIME multivibrators 235 includes the tube sections 315, 316 connected as a conventional plate coupled monostable multivibrator. The cathodes of the tube sections 315, 316 are connected directly to a ground connection 317. The plates of the tube sections 315, 316 are connected to a positive 200 v. supply through resistors 318, 319 respectively. The plate of the tube section 315 is also connected to the grid of the tube section 316 through a capacitor 320, and the grid of the tube section 316 is connected to the positive 200 v. plate supply through a resistor 321 and a potentiometer 322. The constants of the capacitor 320, the resistor 321, and the potentiometer 322 determine the on-time period of the multivibrator 235.

The relay driver and relay section 237 includes a tube section 325 which controls energization of a relay coil 326. The grid of the tube section 325 is D.C. coupled to the plate of the tube section 316 via a resistor 327 and a capacitor 328. The grid of the tube section 325 is connected to a negative 150 v. supply through a resistor 329. The resistors 327, 329 form a voltage divider which normally biases the tube section 325 to cut off. When the ON-TIME multivibrator 235 commences operation during its on-time period, the grid of the relay driver tube 325 is driven positively causing it to conduct heavily. The conductive state of the relay driver tube 325 permits current to flow through the relay coil 326 which is connected to a positive 450 v. supply through a resistor 330. The energized relay coil 326 operates contacts 331, 332. The contacts 331 control energization of the solenoid valve 14. The contacts 332 control energization of a lamp and bell circuit (not shown). A diode 333 is connected across the relay coil 326 and the resistor 330 to suppress switching transients.

In conclusion, the present invention may be described as an apparatus for marking defects in moving workpieces and comprising essentially a workpiece marking element, an actuator to move the marking element into engagement with the moving workpiece, a defect detection instrument disposed adjacent the workpiece and producing a defect signal for each defect detected, and a control circuit connected to the actuator and to the defect detection instrument and transmitting energizing signals to the actuator in a predetermined relation to the defect signals received from the detection instrument. In one form the control circuit produces a plurality of equally spaced, timed energizing pulses for the duration of each defect signal so that a plurality of marks are made over the length of each defect. In another form the control circuit delays production of the energizing signal until a predetermined time after receiving the defect signal so that the mark falls exactly on the location of the defect. The latter control circuit also accommodates all the defect signals received during each delay period so that every defect detected is marked.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus for marking the location of defects in a longitudinally moving workpiece, said apparatus comprising:
   (a) a defect marker movably mounted for movement between a marking position engaging the workpiece and a retracted position spaced from the workpiece;
   (b) actuator means operatively connected to said defect marker for moving it to the marking position in response to an energizing signal;
   (c) defect detection means disposed adjacent said workpiece, said detection means having an output producing a defect signal for the duration of each defect detected; and,
   (d) control means having an input connected to the output of the defect detection means and an output connected to the actuator means, said control means, in response to a defect signal introduced at its input, producing at its output a plurality of energizing signals of predetermined duration and spacing so that said marker is caused to mark the moving workpiece intermittently for the duration of the defect detected.

2. An apparatus for marking the location of defects, in a longitudinally moving workpiece, said apparatus comprising:
   (a) a defect marker movably mounted for movement between a marking position engaging the workpiece and a retracted position spaced from the workpiece;
   (b) actuator means including energizable and movable elements, said movable element being connected to said defect marker and adapted to move it to the marking position whenever an energizing signal is introduced to the energizable element;
   (c) defect detection means disposed adjacent said workpiece, said detection means having an output producing a defect signal for the duration of each defect detected; and,
   (d) control means having an input connected to the output of the defect detection means and an output connected to the energizable element of the actuator means, the output of said control means producing energizing signals of predetermined duration and spacing in response to a defect signal introduced at its input, and the number of said energizing signals per each defect signal being proportional to the number of times the duration of the defect signal is divisible by the predetermined duration and spacing of one energizing signal.

3. An apparatus for marking the location of defects in a longitudinally moving workpiece, said apparatus comprising:
   (a) a defect marker movably mounted for movement between a marking position engaging the workpiece and a retracted position spaced from the workpiece;
   (b) actuator means including energizable and movable elements, said movable element being connected to said defect marker and adapted to move it to the marking position whenever an energizing signal is introduced to the energizable element;
   (c) defect detection means disposed adjacent said workpiece, said detection means having an output producing a defect signal for the duration of each defect detected;
   (d) a pulse forming means having an input connected to the output of said detection means, and an output producing an energizing pulse of predetermined duration each time a signal is introduced into its input, said output being connected to said energizable element to energize it with said energizing pulse;
   (e) a gating circuit having an input connected to the output of said detection means, an output connected to the input of said pulse forming means, and a control, said gating circuit being normally closed and passing to its output the defect signals received at its input, and said gating circuit being open whenever a control pulse is applied to its control so that the defect signals do not pass to its output; and,
   (f) delay circuit means having an input connected to the output of the pulse forming means and an output connected to the control of the gating circuit, said delay circuit means producing a control pulse at its output a predetermined time after receiving an energizing pulse at its input.

4. The apparatus of claim 3 including, in combination:
   (g) said pulse forming means including means to adjust the duration of the energizing pulse; and,
   (h) said delay circuit means including means to adjust the duration of said control pulse whereby the longitudinal length of the marks on the moving workpiece is set by the adjusting means of the pulse forming means and the spacing between the marks is set by the adjusting means of the delay circuit means.

5. An apparatus for marking the location of defects in a longitudinally moving workpiece, said apparatus comprising:
   (a) a defect marker movably mounted for movement between a marking position engaging the workpiece and a retracted position spaced from the workpiece;
   (b) actuator means including energizable and movable elements, said movable element being connected to said defect marker and adapted to move it to the marking position whenever an energizing signal is introduced to the energizable element;
   (c) defect detection means disposed adjacent said workpiece, said detection means having an output producing a defect signal for the duration of each defect detected;
   (d) a first single-shot multivibrator having an input, and an output producing an energizing pulse of predetermined duration each time a signal pulse is introduced into the input, said output being connected to said energizable element;
   (e) a normally closed first gating circuit having an input connected to said detection means, an output connected to the input of the single-shot multivibrator and producing a signal pulse whenever a defect signal is applied to its input, and a control, said first gating circuit being open whenever a control pulse is applied to its control so that said signal pulse is not produced by its output;
   (f) a second single-shot multivibrator having an input connected to the output of the first multivibrator, and an output producing a trigger pulse of predetermined duration at the termination of each energizing pulse received from the first multivibrator; and,
   (g) a normally open second gating circuit having an input connected to the output of the second multivibrator, an output connected to the input of a first multivibrator, and a control connected to the output of the detection means, the output of said second gating circuit being a signal pulse coincident with the termination of the trigger pulse introduced to its input whenever a defect signal is introduced to its control.

6. An apparatus for marking the location of defects in a longitudinally moving workpiece, said apparatus comprising:
   (a) a defect marker movably mounted for movement between a marking position engaging the workpiece and a retracted position spaced from the workpiece;
   (b) actuator means including energizable and movable elements, said movable element being connected to said defect marker and adapted to move it to the marking position whenever an energizing signal is introduced to the energizable element;
   (c) defect detection means disposed adjacent said workpiece, said detection means having an output producing a defect signal for the duration of each defect detected;
   (d) trigger circuit means having an output producing a defect signal pulse having a duration equal to the duration of the defect signal;
   (e) a first gating circuit having an input, an output, and a control;
   (f) differentiating circuit means connecting the input of said first gating circuit to the output of said trigger circuit and differentiating the defect signal pulse to form a trigger pulse coincident with the leading edge of the defect signal pulse;
   (g) said first gating circuit being, in effect, normally closed so that when no control signal is applied to its control, its output produced a trigger pulse similar to that introduced to its input;
   (h) a first single-shot multivibrator having an input connected to the output of the first gating circuit and an output producing an energizing pulse of predetermined duration in response to each trigger pulse introduced to its input;

(i) means connecting the output of said first multivibrator to the energizable element of said actuator means so that said marker engages the moving workpiece for the duration of each energizing pulse;

(j) a second single-shot multivibrator having an input, and an output producing a control pulse of predetermined duration in response to each trigger pulse introduced to its input;

(k) a second differentiating circuit connecting the output of said first multivibrator to the input of said second multivibrator and differentiating said energizing pulse to form a trigger pulse coincident with the trailing edge of said energizing pulse;

(l) a second gating circuit having an input connected to the output of said second multivibrator, an output connected to the input of the first multivibrator, and a control connected to the output of said trigger circuit means;

(m) said second gating circuit including differentiating means to form a trigger pulse at the output of the second gating circuit coincident with the trailing edge of each pulse introduced to its input; and, (n) said second gating circuit being, in effect, normally open and producing trigger pulses at its output only for the duration of a defect signal pulse introduced at its control.

7. The combination of claim 6, including, in combination:

(o) said defect marker including a rotating cutter adapted to make an impression in the workpiece when said defect marker is in the marking position.

8. An apparatus for marking the location of defects in a longitudinally moving workpiece, said apparatus comprising:

(a) a defect marker movably mounted for movement between a marking position engaging the workpiece and a retracted position spaced from the workpiece;

(b) actuator means including energizable and movable elements, said movable element being connected to said defect marker and adapted to move it to the marking position whenever an energizing signal is introduced to the energizable element;

(c) defect detection means disposed adjacent said workpiece and ahead of the defect marker relative to the moving workpiece, said detection means including an output producing a defect signal for each defect detected;

(d) a counting circuit having an input and a plurality of outputs, said input being connected to the output of said detection means;

(e) said counting circuit passing the defect signals sequentially to its outputs;

(f) a like plurality of delay circuits each having an input connected to a different output of the counting circuit, the delay period of each delay circuit being the time it takes a point on the workpiece to move from the detection means to the defect marker; and, (g) a pulse forming means having an input connected to the outputs of all the delay circuits and an output connected to said energizable element, said pulse forming means producing an energizing pulse at its output in response to each defect signal introduced at its input.

9. The apparatus of claim 8 wherein the number of delay circuits is proportional to the maximum number of defects expected to be encountered during a single delay period.

10. The apparatus of claim 8 including, in combination:

(h) said pulse forming means including means to adjust the duration of the energizing pulse.

11. An apparatus for marking the location of defects in a longitudinally moving workpiece, said apparatus comprising:

(a) a defect marker movably mounted for movement between a marking position engaging the workpiece and a retracted position spaced from the workpiece;

(b) actuator means including energizable and movable elements, said movable element being connected to said defect marker and adapted to move it to the marking position whenever an energizing signal is introduced to the energizable element;

(c) defect detection means disposed adjacent said workpiece and ahead of the defect marker relative to the moving workpiece, said detection means including an output producing a defect signal for each defect detected where a maximum number of "N" defects are likely to occur in the time period it takes for a point on the workpiece to move from said detection means to said defect marker;

(d) a counting circuit including a multi-cathode counting tube having a guide grid means, said guide grid means being connected to the output of said detection means;

(e) every Nth cathode of said counting tube being connected together to provide "N" outputs;

(f) "N" delay circuits each having an input and an output, the inputs being connected to a different output of the counting tube;

(g) the delay period of each delay circuit being said time period for a point on the workpiece to move from the detection means to the defect marker; and, (h) a single-shot multivibrator having an input connected to the outputs of all the delay circuits and an output connected to said energizable element, said multivibrator producing an energizing pulse of predetermined duration at its output in response to each defect signal received from the delay circuits.

12. The apparatus of claim 11 including, in combination:

(i) said defect marker including a rotating cutter adapted to make an impression in the workpiece when said defect marker is in the marking position.

13. An apparatus for marking the location of defects in a traveling workpiece comprising:

(a) guide means for establishing a longitudinal path of workpiece travel;

(b) a defect marker including a rotating cutter adapted to cut a permanent impression in a workpiece, said cutter being mounted for movement between a marking position projecting into the path of travel for engaging a workpiece and a retracted position spaced from the path of travel;

(c) means urging said cutter toward one of said positions;

(d) actuator means operatively connected to said cutter for moving it to the other of said positions in response to an energizing signal;

(e) defect detection means disposed adjacent said path of travel, said detection means having an output for producing a defect signal in response to a defect detected in a workpiece;

(f) control means having an input connected to the output of said detection means and an output connected to said actuator means, said control means producing an energizing signal at its output in response to a defect signal received at its input whereby said actuator means moves said cutter to said other position at least once for each defect detected;

(g) stop means carried by said apparatus for limiting movement of said cutter relative to the path of travel when said cutter is moved to the marking position so as to limit the depth of the impression cut by said cutter; and, (h) an adjustment means interposed between the guide means and the stop means whereby the depth of the impression made by said cutter may be adjusted and set at a predetermined depth.

14. The apparatus of claim 13 including, in combination;

(i) said control means including means to adjust the duration of said energizing signal so that the length of the mark may be adjusted.

15. The apparatus of claim 14 including, in combination;
   (j) said detection means and said workpiece being relatively rotatable so that said detection means describes a helical path around said workpiece as said workpiece travels relative to said detection means.

16. An apparatus for marking the location of defects in a longitudinally moving workpiece, said apparatus comprising:
   (a) a base including means for establishing a longitudinal path of workpiece travel;
   (b) a defect marker including a rotating cutter adapted to cut a permanent impression in a workpiece, said cutter being mounted for movement between a marking position projecting into the path of travel for engaging a workpiece and a retracted position spaced from the path of travel;
   (c) means urging said cutter toward one of said positions;
   (d) actuator means having an energizable element and a movable element operatively connected to said cutter and adapted to move said cutter to the other of said positions when an energizing signal is introduced to said energizable element;
   (e) a defect detection device disposed adjacent the path of workpiece travel, said device and the workpiece being relatively rotatable so that one moves helically relative to the other as the workpiece moves longitudinally;
   (f) said defect detection device being spaced ahead of the cutter relative to the moving workpiece, the space between the defect detection device and the cutter being substantially the distance of longitudinal travel of the workpiece for one relative revolution of the workpiece and the detection device;
   (g) said defect detection device having an output producing a defect signal for each defect detected;
   (h) a control circuit having an input connected to the output of said detection device and an output connected to the energizable element of said actuator means;
   (i) said control circuit producing an energizing signal at its output for each defect signal received at its input;
   (j) said control circuit including means to adjust the duration of said energizing signal whereby the length of the mark cut in the workpiece may be adjusted by adjusting the time duration of the energizing signal; and,
   (k) said control circuit including adjustable time delay means to delay each energizing signal relative to its corresponding defect signal for a period of one revolution of the workpiece relative to the detection device whereby the cutter may be caused to engage the workpiece at the location of the defects detected by said detection device.

17. An apparatus for marking the location of defects in a longitudinally moving workpiece, said apparatus comprising:
   (a) a defect marker movably mounted for movement between a marking position engaging the workpiece and a retracted position spaced from the workpiece;
   (b) actuator means connected to said defect marker and adapted to move said defect marker to a marking position whenever an energizing signal is introduced to an input of the actuator means;
   (c) defect detection means diposed adjacent said workpiece and ahead of the defect marker relative to the moving workpiece, said detection means including an output producing a defect signal for each defect detected;
   (d) separation circuit means having an input and a plurality of outputs, said input being connected to the output of said detection means, said separation circuit means effectively passing the defect signals received at its input sequentially to its outputs;
   (e) a like plurality of individual delay circuits each having an input connected to a different output of the separation circuit means, delay periods of the delay circuits being substantially the time it takes a point on the workpiece to move from the detection means to the defect marker; and,
   (f) energizing pulse producing means having an input connected to the outputs of all the delay circuits and an output connected to the input of said actuator means, said pulse producing means producing an energizing pulse at its output in response to each defect signal introduced at its input whereby the distinctiveness of the defect signals received by the separation circuit is maintained.

18. The apparatus of claim 17 wherein the defect detection means and the workpiece are relatively rotatable and one moves helically relative to the other, the detection means is located ahead of the defect marker a distance equal to the amount of workpiece travel per revolution whereby the delay periods of the delay circuits are the period required for one revolution of the workpiece relative to the defect detection means.

References Cited by the Examiner
UNITED STATES PATENTS

| | | | |
|---|---|---|---|
| 1,933,351 | 10/33 | Suits et al. | 324—37 |
| 1,984,465 | 12/34 | Dana | 324—37 |
| 2,055,672 | 9/36 | Roop | 324—37 |
| 2,246,906 | 6/41 | Viebahn et al. | 324—37 X |
| 2,309,343 | 1/43 | Farrow | 83—371 X |
| 2,871,940 | 2/59 | Meunier | 83—362 |

WILLIAM W. DYER, JR., *Primary Examiner.*